(12) United States Patent
Mackenzie et al.

(10) Patent No.: US 6,183,013 B1
(45) Date of Patent: Feb. 6, 2001

(54) HYDROFORMED SIDE RAIL FOR A VEHICLE FRAME AND METHOD OF MANUFACTURE

(75) Inventors: Steven K. Mackenzie, West Bloomfield; Ferdous M. Ghazi; Chi-Mou Ni, both of Troy; John Roby, Northville, all of MI (US)

(73) Assignee: General Motors Corporation, Detroit, MI (US)

(*) Notice: Under 35 U.S.C. 154(b), the term of this patent shall be extended for 0 days.

(21) Appl. No.: 09/359,883

(22) Filed: Jul. 26, 1999

(51) Int. Cl.[7] ................................................. B62D 21/00
(52) U.S. Cl. ............................................. 280/797; 280/798
(58) Field of Search ...................................... 280/797, 798

(56) References Cited

U.S. PATENT DOCUMENTS

| | | | |
|---|---|---|---|
| 2,880,013 | * 3/1959 | Dean | 280/798 |
| 3,912,295 | * 10/1975 | Eggert, Jr. | 280/798 |
| 5,491,883 | 2/1996 | Marlinga | 29/421.1 |
| 5,557,961 | 9/1996 | Ni et al. | 72/61 |
| 5,561,902 | 10/1996 | Jacobs et al. | 29/897.2 |
| 5,600,983 | 2/1997 | Rigsby | 72/61 |
| 5,644,829 | 7/1997 | Mason et al. | 29/421.1 |
| 5,673,929 | 10/1997 | Alatalo | 280/690 |
| 5,718,048 | 2/1998 | Horton et al. | 29/897.2 |
| 5,720,092 | 2/1998 | Ni et al. | 29/421.1 |
| 5,802,898 | 9/1998 | Roper | 72/58 |
| 5,882,039 | * 3/1999 | Beckman et al. | 280/798 |
| 6,010,155 | * 1/2000 | Rinehart | 280/798 |

* cited by examiner

Primary Examiner—Kenneth R. Rice
(74) Attorney, Agent, or Firm—Jeffrey A. Sedlar

(57) ABSTRACT

A vehicle frame has side rails which support the suspension system and body of the vehicle. The side rails have a rectangular cross-section with the end sections thereof having predetermined wall thicknesses and rectangular size, and a center section having a thinner wall thickness and a larger height dimension of the rectangular cross-section. A transition section connects respective end sections with the center section. The transition section has rectangular cross-sections and wall thickness at the respective junctures which matches the adjoining section. The frame side rail is manufactured by prebending a cylindrical tube of constant wall thickness into a shape consistent with the desired final shape; then hydroforming an intermediate work piece in a first die to provide wall thickness and perimeter characteristics commensurate with the final product; and then further hydroforming the intermediate work piece in a second die to provide the finished product or to provide two components which are joined to form the final frame side rail. When two intermediate work pieces are processed, each is formed with an end section and a part of the center section.

6 Claims, 3 Drawing Sheets

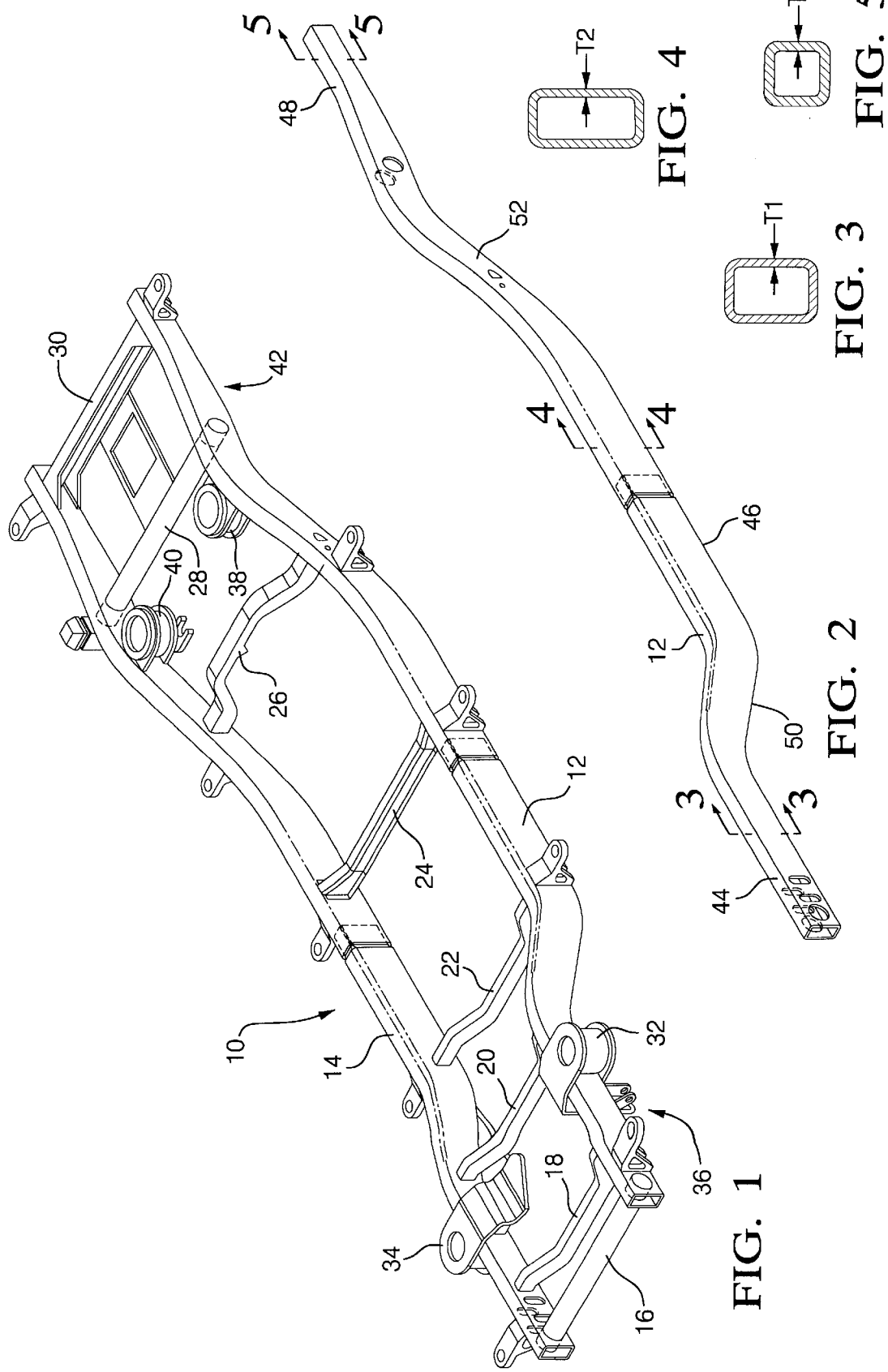

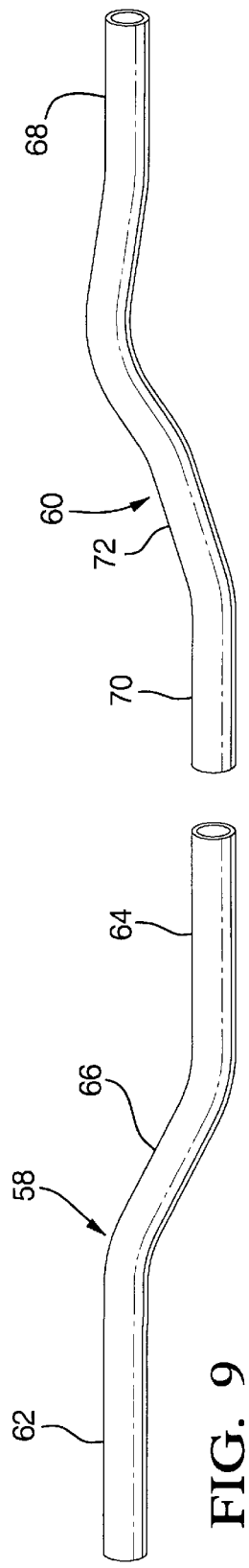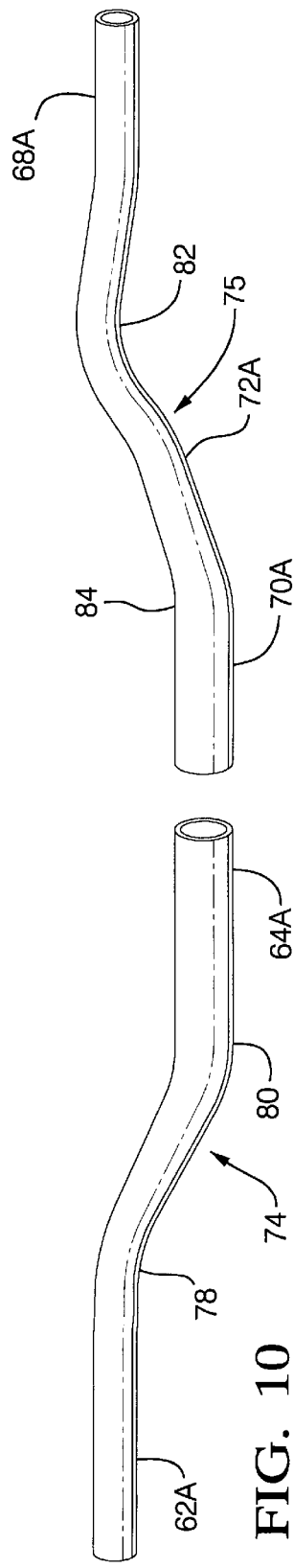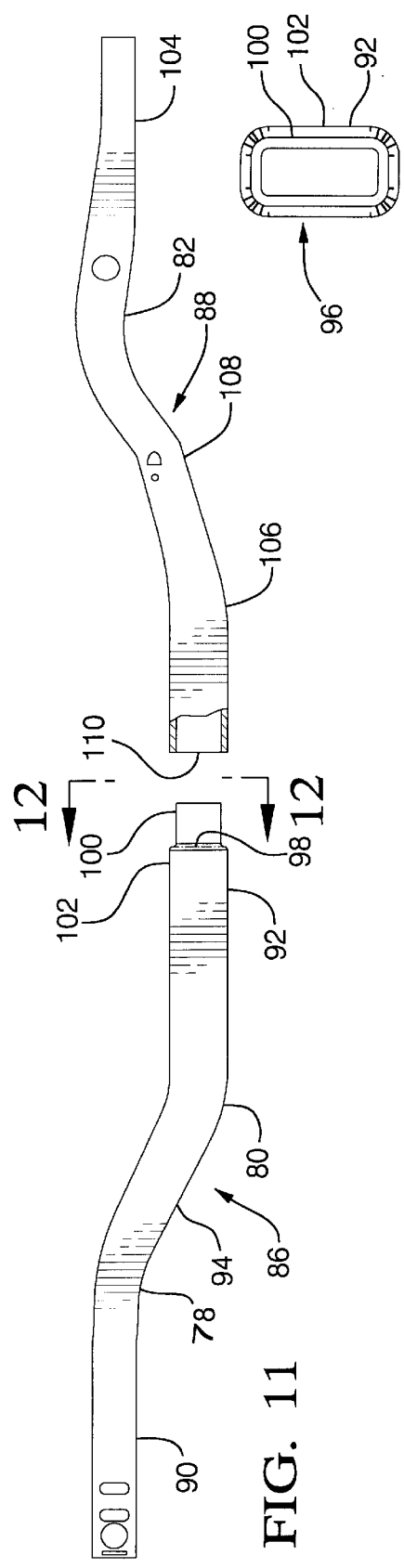

HYDROFORMED SIDE RAIL FOR A VEHICLE FRAME AND METHOD OF MANUFACTURE

TECHNICAL FIELD

This invention relates to vehicle frames and more particularly to the forming and manufacture of vehicle frames.

BACKGROUND OF THE INVENTION

Automotive vehicles, such as trucks, have a supporting ladder frame on which a passenger compartment and a cargo supporting bed are attached. The frame has a suspension system and supporting wheels depending therefrom. The ladder frame typically employs two frame side rails that are interconnected by transverse beam members. These components, side rails and transverse beams are welded to form the ladder frame. As a general rule the frame side rail is constructed from many components welded together. In many instances both rectangular tube and channel structures are used in a welded frame assembly with the end components being tubular and the center components being channel structures.

The multiple components of the frame side rails are welded into a single structure. Each of the components has a unique shape. For example, the fore and aft end pieces have one cross-sectional area and the center piece or pieces have a second cross-sectional area. The fore and aft pieces are joined with the center piece through a transitional piece which has cross-sectional areas to match the adjoining pieces. The wall thickness of various pieces, however, is substantially constant.

The wall thickness is determined by the component needing the most mass to provide the required support. Generally this is the fore and aft pieces which are attached to the suspension components. The center pieces have more thickness than required and therefore more mass and weight. The center pieces generally need a larger height to width ratio cross-section to accommodate the required torsional rigidity and bending strength of the frame during vehicle operation.

Many of the prior art frame side rails are constructed by roll forming the various components of the side rail. A bending process is employed to form a side rail member having a rectangular cross section. Following the bending process, the abutting edges are welded to complete the rectangular tube. This process has been replaced in many designs with a hydroforming process. However, the center sections of the side rails remain as "C" channel sections. Even with the advent of the hydroforming process, the side rails continue to be manufactured from three or more components with substantially constant wall thickness.

It has been proposed to provide a polygonal shaped hydroformed component with the individual walls thereof having a distinct thickness in U.S. Pat. No. 5,557,961. However this patent requires pre-forming of a tubular member with an asymmetrical inner surface prior to the hydroforming process. With this process, the entire length of the component has the tailored thickness on each wall.

SUMMARY OF THE INVENTION

It is an object of the present invention to provide an improved frame rail and method of making the frame rail.

In one aspect of the invention a constant wall thickness, tubular work component is bent to form the basic shape of having an end section, a center section and a transition section joining the end and center sections. In another aspect of the present invention the formed component is hydroformed to provide an intermediate work piece having a first wall thickness in the end section, a second and thinner wall section in the center section and a varying wall thickness in the transition section.

In yet another aspect of the present invention, the hydroformed component is further expanded using a hydroforming process to provide a finished frame rail component. In still another aspect of the present invention, the tubular work component is bent to provide two end sections, one center section and two transition section between respective ones of the end sections and the center section. In a further aspect of the present invention, a finished frame rail has two end sections, a center section and two transitional sections. In yet a further aspect of the present invention, a finished frame rail is provided by merging two frame rail components at the respective center sections thereof.

BRIEF DESCRIPTION OF THE DRAWINGS

FIG. 1 is an isometric view of a vehicle frame incorporating the present invention.

FIG. 2 is an isometric view of a frame side rail incorporating the present invention.

FIG. 3 is a sectional view taken along line 3—3 in FIG. 2.

FIG. 4 is a sectional view taken along line 4—4 in FIG. 2.

FIG. 5 is a sectional view taken along line 5—5 in FIG. 2.

FIG. 9 is an elevational view of two tube members showing the pre-bent shape of the frame rail.

FIG. 10 is an elevational view of the two tube members following a first hydroforming operation.

FIG. 11 is an elevational view of two frame side rail components following the final hydroforming prior to being joined to form a single frame side rail incorporating the present invention.

FIG. 12 is an end view taken along line 12—12 in FIG. 11.

DESCRIPTION OF AN EXEMPLARY EMBODIMENT

Figure 6:
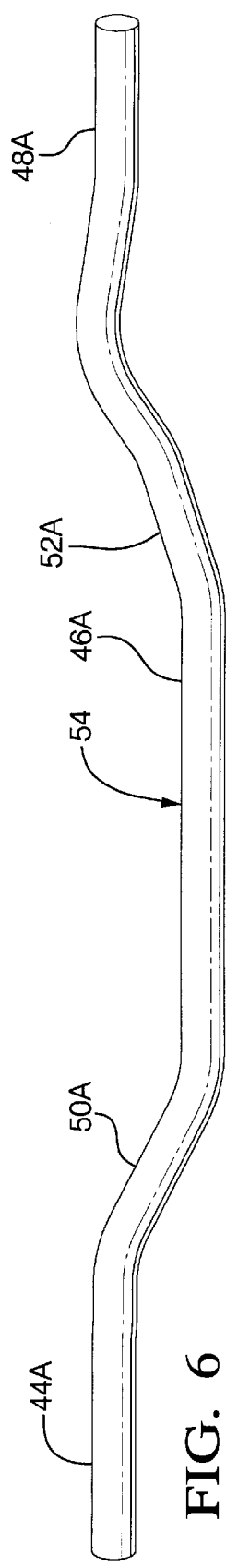
FIG. 6 is an elevational view of a tube member showing the pre-bent shape of the frame rail.

A vehicle frame 10, as seen in FIG. 1, has two frame side rails 12 and 14 that are interconnected by a plurality of cross members 16, 18, 20, 22, 24, 26, 28, and 30. The cross members 16–30 add stiffness and rigidity to the frame 10. The configuration of the side rails and cross members have given rise to the term "ladder frame" which is usually described when referring to this type of vehicle frame. The frame side rails 12 and 14 have conventional suspension mounting structures 32 and 34 secured, generally by welding, to a forward section 36 of the frame, and conventional suspension mounting structures 38 and 40 secured to an aft section 42 of the frame 10. The front wheels, not shown, of the vehicle are suspended from suspension components, such as springs and shock absorbers, from the mounting structures 32, 34. The rear wheels, not shown. Are suspended from the mounting structures 38 and 40. Other mounting structures are also secured to the frame side rails to provide paints at which the vehicle body will be attached to the frame 10.

The frame side rails 12 and 14 are substantially mirror images such that the description of one, i.e. frame side rail 12, FIG. 2, will suffice as a description for both. The frame side rail 12 has a forward end section 44, a center section 46 and an aft end section 48. The forward end section 44 is formed integrally with the center section 46 through a forward transition section 50. The aft end section 48 is formed integrally with the center section 46 through a rear transition section 52. The forward end section 44 is substantially rectangular in cross-section and has a wall thickness of T1 as seen in FIG. 3. The center section 46 has a substantially rectangular cross-section with a wall thickness of T2 as seen in FIG. 4. The aft end section 48 has a rectangular cross-section with a thickness T3 as seen in FIG. 5. The thickness T2 is less than the thicknesses T1 and T3. The thicknesses T1 and T3 can be identical if desired. The center section 46 can be formed in a single section which is integral with both the forward end section 44 and the aft end section 48 through the respective transition sections 50 and 52. In the alternative, the center section can be formed in two sections that are joined to provide the single center section 46. The present invention resides in the frame side rail and the method of manufacturing the frame side rail.

Figure 7:
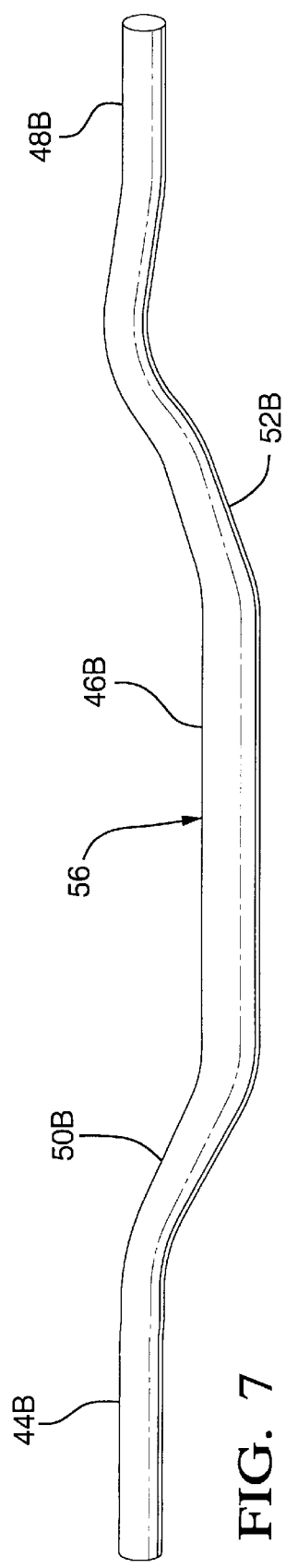
FIG. 7 is an elevational view of the tube following a first hydroforming operation.
Figure 8:
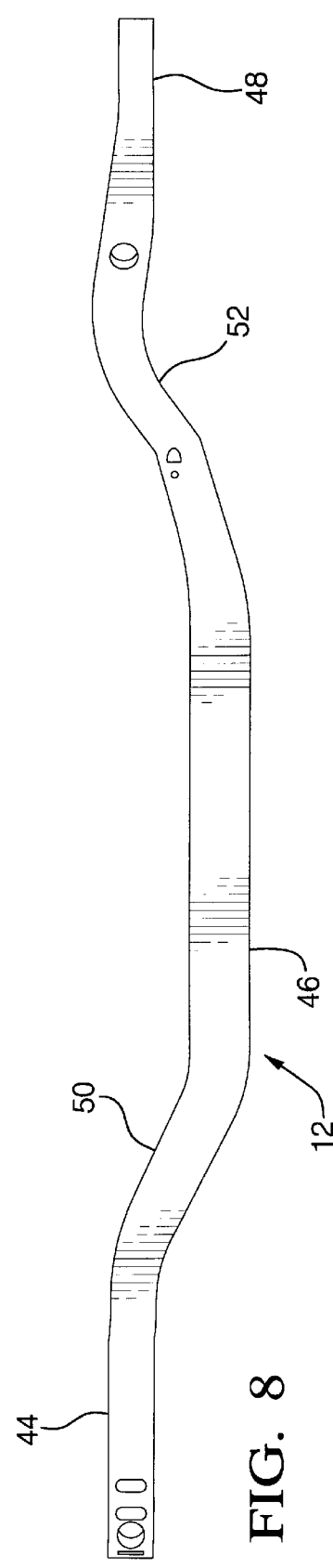
FIG. 8 is an elevational view of the frame side rail incorporating the present invention following the final hydroforming.

FIGS. 6, 7 and 8 depict the shape configurations of the frame side rail as it is manufactured. In FIG. 6, a conventional single thickness cylindrical tubular member has been bent into the basic shape or work piece 54 of the finished frame side 12. The work piece 54 has fore and aft end sections 44A and 48A, a center section 46A and transition sections 50A and 52A. The work piece 54 has substantially the same wall thickness as the tubular member from which it is formed. This is a pre-bending step.

The pre-bent work piece 54 is placed in a conventional hydroforming machine and expanded into the shape or work piece 56 shown in FIG. 7. During the hydroforming process, the forward section 44B and the aft section 48B can be retained at the original wall thicknesses or expanded to new constant wall thicknesses. The center section 46B is expanded to a larger outer diameter and the wall thickness is reduced. The transition sections 50B and 52B have the shape thereof adjacent to the respective sections 44B and 48B unchanged. The wall thickness along the length of the transition sections 50B and 52B is gradually expanded to match the wall thickness of the center section 46B. The rate of thickness change of the transition sections 50B and 52B is preferably constant along the length thereof.
This is a pre-expansion step The pre-expanded work piece 56 is then placed in a hydroforming machine and expanded into the rectangular shaped frame side rail 12 shown in FIG. 8. The forward and aft end sections 44 and 48 are expanded to the rectangular cross-sections having the thicknesses T1 and T3 as shown in FIGS. 3 and 5 respectively. The center section 46 is expanded to form a rectangular cross-section with the thickness T2 as shown in FIG. 4. The transition sections 50 and 52 are expanded to provide a wall thickness change to match the thicknesses T1, T2 and T3 at the respective forward end section 44, the center section 46 and the aft end section 48. The larger cross-section of the center section 46 provides the torsional rigidity needed in a truck frame and the thicker end sections provide the strength and load capacity needed at these positions along the frame. The center section 46 has a larger height to width ratio crossectional area than the either end section 44 and 48. This improves the bending and torsional rigidity of the frame side rail 12.

An alternative method of manufacture for the present invention is shown in FIGS. 9, 10 and 11. In FIG. 9 two cylindrical tubular work pieces 58 and 60 are pre-bent to form sections of the frame side rail 12. The work piece 58 has a forward end section 62, a central section 64 and a transition section 66 disposed between the sections 62 and 64. The work piece 60 has an aft end section 68, a central section 70 and a transition section 72 formed between the sections 68 and 70. Each of the pre-bent work pieces 58 and 60 are placed in hydroforming dies and pressurized to be pre-expanded to form intermediate work pieces 74 and 76.

The forward section 62A of the work piece 74 is preferably expanded in diameter to provide a wall thickness closely matching the finished wall thickness T1. The center section 64A is expanded to a larger diameter with a wall thickness closely matching the finished wall thickness T2. The transition section 66A has a diameter and wall thickness at one end 78 matching the dimensions of the forward end section 62A and a diameter and wall thickness at the other end 80 matching the diameter and wall thickness of the center section 64A.

The aft end section 68A of the work piece 76 is preferably expanded in diameter to provide a wall thickness closely matching the finished wall thickness T3. The center section 70A is expanded to a larger diameter with a wall thickness closely matching the finished wall thickness T2. The transition section 72A has a diameter and wall thickness at one end 82 matching the dimensions of the aft end section 68A and a diameter and wall thickness at the other end 84 matching the diameter and wall thickness of the center section 70A.

The pre-expanded intermediate work pieces 74 and 76 are inserted in hydroforming dies and pressurized internally to form the work pieces 74 and 76 into final components 86 and 88 as seen in FIG. 11. The component 86 has a rectangular forward end section 90, a rectangular center section 92 and a substantially rectangular transition section 94. The rectangular center section 92 has an reduced rectangular portion 96 hydroformed thereon with a slightly smaller end rectangular cross-section than the remainder of the center section 92. The portion 96 converges gradually from a demarcation line 98 to the end of the component 86. The outer wall 100 of the portion 96 converges from the outer surface 102 of the center section 92.

The component 88 has a rectangular aft end section 104, a rectangular center section 106 and a substantially rectangular transition section 108. The transition sections 94 and 108 have thicknesses at the respective ends thereof to match the thicknesses T1, T2 and T3 as required. The rectangular end 110 of the center section 106 is press-fitted over the portion 96 of the center section 92. This joins the component 88 with the component 86. The components 86 and 88 are then welded or otherwise securely bonded together to form the frame side rail 12.

Regardless of the manufacturing process used, the frame rail 12 provides a structure which, when assembled into a vehicle frame 10, provides a structure with the strength, bending and torsional rigidity need in a vehicle frame. The hydroforming and bending processes used to manufacture the unique frame side rail are well known processes that are common in today's manufacturing environment. The final product is manufactured to make the most efficient use of materials. The number of external processes such as welding, transporting from work station to work station and in process inventory, needed to complete a conventional frame side rail are kept to a minimum.

What is claimed is:

1. A method of making a frame side rail for a vehicle frame comprising:

pre-bending a constant diameter cross-section tubular member to a configuration having a first end section, a center section and a first transition section joining the end section and the center section to substantially the same as a desired final shape of the frame side rail;

pre-expanding said center section to an increased diameter and said transition section of said pre-bent tubular member to a new configuration, having one end portion thereof with a diameter equal to the end section and another end portion thereof equal with the increased diameter of said center portion, in a single hydroforming process; and hydroforming the pre-expanded tubular member into a side rail of substantially rectangular cross-section with said end section having a first wall thickness, said center section having a second wall thickness less than said end section and said transition section having a varying wall thickness which is equal to the first end section wall thickness at a first position adjacent thereto and equal to the center section wall thickness at a second position adjacent thereto.

2. A method of making a frame side rail for a vehicle frame defined in claim 1 further comprising:

making a first frame side rail as defined in claim 1;

making a second frame side rail having a configuration similar to the side rail made in claim 1 with a rectangular end portion of the center section being reduced in crossectional area to fit firmly into a rectangular opening in an end of the center section of the first side rail;

welding the first and second frame side rails at the fitted intersection to form a single side rail.

3. A frame side rail manufactured in accordance with the method of claim 1.

4. A method of making a frame side rail for a vehicle frame comprising:

pre-bending a constant diameter cross-section tubular member to a configuration having first and second end sections, a center section and first and second transition sections joining the respective ones of the first and second end section and the center section to substantially the same as a desired final shape of the frame side rail;

pre-expanding said center section to an increased diameter and said transition sections of said pre-bent tubular member to a new configuration, having one end portion thereof with a diameter equal to the respective end section and another end portion thereof equal with the increased diameter of said center portion, in a single hydroforming process; and hydroforming the pre-expanded tubular member into a side rail of substantially rectangular cross-section with said end sections having first and second wall thicknesses, said center section having a third wall thickness less than said end sections and said transition section having a varying wall thickness which is equal to the respective end section wall thickness at a first position adjacent thereto and equal to the center section wall thickness at a second position adjacent thereto.

5. A frame side rail manufactured in accordance with the method defined in claim 4.

6. A hydroformed frame side rail for a vehicle frame comprising:

spaced end sections having a first and second rectangular cross-sectional area with respective first and second wall thicknesses and having a first height to width ratio;

first and second transition sections having each having a first end rectangular cross-sectional area integrally hydroformed contiguous with respective ones of said first and second end sections and a second end rectangular cross-sectional area; and a center section having a third rectangular crossectional area having a third wall thickness and a second height to width ratio greater than said first height to width ratio and having first and second portions thereof being hydroformed contiguous with respective ones of said first and second transition sections.

* * * * *